(12) United States Patent
Abe et al.

(10) Patent No.: US 6,576,203 B2
(45) Date of Patent: *Jun. 10, 2003

(54) REFORMER

(75) Inventors: Fumio Abe, Handa (JP); Naomi Noda, Ichinomiya (JP); Junichi Suzuki, Kuwana (JP)

(73) Assignee: NGK Insulators, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 2 days.

This patent is subject to a terminal disclaimer.

(21) Appl. No.: 09/339,295

(22) Filed: Jun. 24, 1999

(65) Prior Publication Data

US 2002/0054837 A1 May 9, 2002

(30) Foreign Application Priority Data

| Jun. 29, 1998 | (JP) | .......................... 10-183014 |
| Jun. 29, 1998 | (JP) | .......................... 10-183015 |
| Jun. 29, 1998 | (JP) | .......................... 10-183016 |

(51) Int. Cl.$^7$ .............................. B01J 7/00; B01J 8/00; B01J 8/02; B01J 8/04
(52) U.S. Cl. .................. 422/191; 422/188; 422/190; 422/211; 422/222; 48/61; 48/127.9
(58) Field of Search ................................ 422/174, 177, 422/180, 188, 190, 191, 193, 211, 222; 48/61, 127.9

(56) References Cited

U.S. PATENT DOCUMENTS

| 5,108,716 A | | 4/1992 | Nishizawa .................. 422/171 |
| 5,538,697 A | * | 7/1996 | Abe et al. .................... 422/171 |
| 5,658,681 A | * | 8/1997 | Sato et al. ...................... 429/13 |
| 5,702,838 A | * | 12/1997 | Yasumoto et al. ............. 429/40 |

FOREIGN PATENT DOCUMENTS

| EP | 0625481 | 11/1994 |
| EP | 0820810 | 1/1998 |
| JP | 8-40703 | 2/1996 |

* cited by examiner

*Primary Examiner*—Jerry D. Johnson
*Assistant Examiner*—Alexa A. Doroshenk
(74) *Attorney, Agent, or Firm*—Parkhurst & Wendel, L.L.P.

(57) ABSTRACT

A reformer includes two or more catalyst units in the flow path, capable of generating hydrogen from a reactant fluid containing an organic compound or carbon monoxide, by catalysis. In the reformer, at least two of the catalyst units satisfy the following relationship: Heat capacity of the upstream-side catalyst unit≦Heat capacity of the downstream-side catalyst unit. The reformer is improved in the relationship between these catalyst units with respect to heat capacity. This improvement leads to improvement of the reformer in safety, heating characteristics during the start-up period, efficiency of hydrogen production and reduction in production of CO as the coproduct.

33 Claims, 9 Drawing Sheets

REFORMER

BACKGROUND OF THE INVENTION

(1) Field of the Invention

This invention relates to a reformer for hydrogen generation, suitably used in industries and vehicles.

(2) Description of the Related Art

In recent years, production of electricity without causing environmental pollution has drawn attention and an interest in fuel cell has increased. Fuel cell has various advantages such as high efficiency in power generation, formation of small amount of carbon dioxide ($CO_2$) and substantially no formation of harmful substances such as carbon monoxide (CO), nitrogen oxides ($NO_x$) or the like. Therefore, researches and developments on use of fuel cell in on-site type power generator or automobile have been under way recently. In generating electricity using a fuel cell, high-purity hydrogen is required. This hydrogen is produced by using, as a starting material, a hydrocarbon (e.g., butane or propane), an alcohol (e.g., methanol), CO or the like and conducting a catalytic reaction.

The main reaction in the above hydrogen production is steam reforming which takes place in the presence of steam and a catalyst. In the gas produced by steam reforming, however, hydrogen has not a sufficient purity to be used in a fuel cell, and CO which is a coproduct of hydrogen has a deactivating effect on Pt-based electrode used in the fuel cell. Therefore, a CO shift reaction (an aqueous conversion reaction) and a selective CO oxidation reaction are conducted to increase hydrogen purity.

As still another process for generating hydrogen from a hydrocarbon or the like, there is a process which comprises generating hydrogen and CO by a partial oxidation reaction of a hydrocarbon in place of the above-mentioned steam reforming and then conducting the above-mentioned CO shift reaction and CO selective oxidation reaction to obtain hydrogen. As still another process for generating hydrogen from a hydrocarbon or the like, there is a process using a decomposition reaction. A specific example of the decomposition reaction is a decomposition reaction for generating hydrogen from methanol.

It is known, in the reformer for producing hydrogen based on the above reactions, that one of suitable reactor configurations is disposition of a plurality of catalyst units in the flow path for individual reactions, such as steam reforming, CO shift reaction and selective CO oxidation. However, the relationship between these catalyst units with respect to heat capacity has not been fully investigated for the reformer in which two or more catalyst units are disposed.

Attempts have been done to use a honeycomb structure for each of the above catalyst units. However, the relationship between these catalyst units with respect to cell density has not been fully investigated for the reformer in which two or more catalyst units are disposed.

The present invention is developed to improve the above situations. It is an object of the present invention to improve safety, heating characteristics during the start-up period, efficiency of hydrogen production and reduction in production of CO as the coproduct for a reformer in which two or more catalyst units are disposed in the flow path by improving the relationship between these catalyst units with respect to heat capacity.

It is another object of the present invention to improve, e.g., efficiency of hydrogen production and reduction in production of CO as the coproduct for a reformer in which two or more catalyst units of a honeycomb structure are disposed in the flow path by improving the relationship between these catalyst units with respect to cell density, in particular in consideration of the case where the reaction taking place in the catalyst unit is essentially exothermic or endothermic to release or absorb a large quantity of heat, or where the reactant is charged into the reactor at a high concentration.

It is still another object of the present invention to improve, e.g., efficiency of hydrogen production and reduction in production of CO as the coproduct for a reformer in which two or more catalyst units of a honeycomb structure are disposed in the flow path by improving the relationship between these catalyst units with respect to cell density, in particular in consideration of the case where the reaction taking place in the catalyst unit is not so fast as combustion, or where the reactant stream contains a poisonous material to the catalyst, e.g., gasoline.

SUMMARY OF THE INVENTION

According to the present invention, there is provided, as a first invention, a reformer disposed in the flow path of a reactant fluid, which comprises two or more catalyst units capable of generating hydrogen from a reactant fluid containing an organic compound or carbon monoxide, by catalysis, wherein, at least two of the above catalyst units satisfy the following relationship:

Heat capacity of the upstream catalyst unit ≦ Heat capacity of the downstream catalyst unit Furthermore, according to the present invention, there is provided, as a second invention, a reformer disposed in the flow path of a reactant fluid, which comprises two or more catalyst units of a honeycomb structure capable of generating hydrogen from a reactant fluid containing an organic compound or carbon monoxide, by catalysis, wherein, at least two of the above catalyst units satisfy the following relationship:

Cell density of the upstream catalyst unit ≦ Cell density of the downstream catalyst unit Furthermore, according to the present invention, there is provided, as a third invention, a reformer disposed in the flow path of a reactant fluid, which comprises two or more catalyst units of a honeycomb structure capable of generating hydrogen from a reactant fluid containing an organic compound or carbon monoxide, by catalysis, wherein, at least two of the above catalyst units satisfy the following relationship:

Cell density of the upstream catalyst unit ≧ Cell density of the downstream catalyst unit.

In the present invention, "a catalyst unit of generating hydrogen from a reactant fluid containing an organic compound or carbon monoxide, by catalysis" includes a catalyst unit which shows a catalytic reaction of increasing purity of hydrogen generated from a reactant fluid containing an organic compound or carbon monoxide, by catalysis, e.g., CO shift reaction and selective oxidation of CO. Also in the present invention, the term "honeycomb structure" means a structure having a number of through-holes (cells) separated by a partition from each other.

DETAILED DESCRIPTION OF PREFERRED EMBODIMENTS

The reformer as the first invention comprises two or more catalyst units in the flow path, capable of generating hydrogen from a reactant fluid containing an organic compound or carbon monoxide, by catalysis.

In the reformer of the above configuration, it is preferable that the catalyst unit disposed in the upstream of the flow path (upstream-side catalyst unit) has a lower heat capacity than the one disposed in the downstream of the flow path (downstream-side catalyst unit), to allow the upstream-side catalyst unit to be heated in a short time to an operational temperature level during the cold starting period and not to become a heat sink for the downstream-side catalyst unit. It is generally necessary to forcefully heat a reformer for hydrogen production by an adequate means, because heating of the reactor by the reactant stream per se may not be expected, unlike the case with exhaust gases from an internal combustion engine. A heat capacity design to help heat the catalyst unit, such as the one described above, is needed more by the reformer than by others.

When the upstream-side catalyst unit is for production of hydrogen, the stream flowing into the downstream-side catalyst unit contains hydrogen at a higher concentration than the one flowing into the upstream-side catalyst unit. It is therefore preferable that the downstream-side catalyst unit is designed to have a higher heat capacity than the upstream-side catalyst unit, to prevent the fluid stream from being heated excessively for safety consideration.

Viewed from the above, the reformer of the first invention is characterized by at least two catalyst units satisfying the following relationship (1):

$$\text{Heat capacity of the upstream catalyst unit} \leq \text{Heat capacity of the downstream catalyst unit} \quad (1)$$

Figure 1:
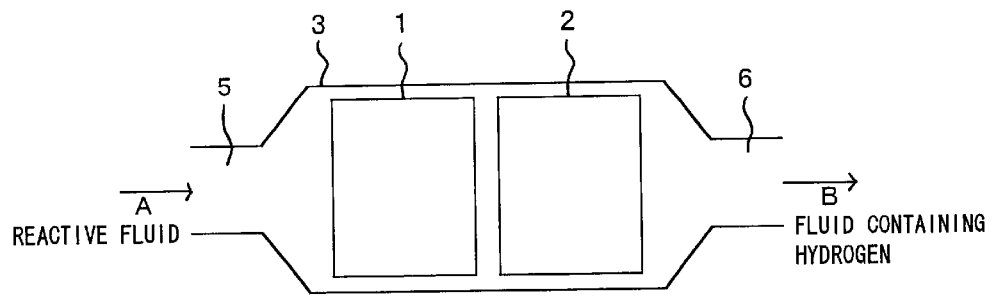
FIG. 1 is a schematic sectional view showing one embodiment of a reformer according to a first invention.

FIG. 1 is a schematic sectional view showing one embodiment of the reformer of the first invention. In FIG. 1, reformer comprises the upstream-side catalyst unit 1 and downstream-side catalyst unit 2 disposed in a metallic casing 3 which forms a flow path of the reactant fluid. A reactant fluid A is fed into the reformer from an inlet 5, passes through the upstream-side catalyst unit 1 and downstream-side catalyst unit 2, and reaches an outlet 6. A fluid B containing the hydrogen produced leaves the outlet 6 and is transferred to a fuel cell section disposed downstream of the reformer. Both the upstream-side catalyst unit 1 and downstream-side catalyst unit 2 are designed to have heat capacities which satisfy the relationship (1).

Heat capacity of the catalyst unit is determined by various factors, such as catalyst component materials (mainly heat-resistant oxide as the substrate for the catalyst metal(s)) and quantities, and material, structure and volume of the carrier. These factors are used, either singly or in combination, to produce the catalyst unit of desired heat capacity for the first invention.

In the preferred embodiment shown in FIG. 1, two catalyst units are disposed in the flow path. However, three or more catalyst units may be disposed along the flow path. In such a case, the intended effect of the present invention can be secured when at least two of the catalyst units satisfy the relationship (1). The effect will be larger when the most upstream catalyst unit and at least one of the downstream catalyst units satisfy the relationship (1), or two catalyst units adjacent to each other satisfy the relationship (1), and still larger when the most upstream catalyst unit and the one adjacent thereto satisfy the relationship (1). It is most preferable that the most upstream catalyst unit and any of the downstream catalyst units satisfy the relationship (1).

For the reformer which uses a catalyst unit of a honeycomb structure, it is preferable that at least two catalyst units satisfy the following relationship (2), in addition to the relationship (1), when the reaction taking place in the catalyst unit is essentially exothermic or endothermic to release or absorb a large quantity of heat, or where the reactant is charged into the reactor at a high concentration:

$$\text{Cell density of the upstream catalyst unit} \leq \text{Cell density of the downstream catalyst unit} \quad (2)$$

In a case where the reaction taking place in the catalyst unit is essentially exothermic or endothermic to release or absorb a large quantity of heat, or where the reactant is charged into the reactor at a high concentration, an undesirable phenomenon of rapid temperature change in the upstream-side catalyst unit may occur, when it has an excessively high cell density, or excessively high contact efficiency with the fluid. For example, when the reaction is accompanied by absorption of a large quantity of heat, temperature at the upstream-side catalyst unit may rapidly decrease, to below an operational level for the catalyst. When the reaction is accompanied by release of a large quantity of heat, on the other hand, temperature may increase rapidly to deteriorate the catalyst or carrier. The stream flowing into the downstream-side catalyst unit contains a lower concentration of the reactant, because it has been already treated to some extent by the upstream-side catalyst unit, and it is preferable to conversely increase cell density of the downstream-side catalyst unit, thereby increasing contact efficiency between the reactant and catalyst sites. Satisfying the relationship (2) is desirable, also viewed from the above.

For the reformer which uses a catalyst unit of a honeycomb structure, it is also preferable that at least two catalyst units satisfy the following relationship (3), in addition to the above relationship between the catalyst units with respect to heat capacity, when the reaction taking place in the catalyst unit is not so fast as combustion, or when the reactant stream contains a poisonous material to the catalyst, e.g., gasoline:

$$\text{Cell density of the upstream catalyst unit} \geq \text{Cell density of the downstream catalyst unit} \quad (3)$$

When the reaction taking place in the catalyst unit is not so fast as combustion, it is preferable to increase cell density of the upstream-side catalyst unit, into which the stream of much higher reactant concentration flows, thereby increasing contact efficiency between the reactant and catalyst sites, in order to accelerate the reaction after temperature at the catalyst unit reaches an operational temperature for the unit. When the reactant stream contains a poisonous material to the catalyst, e.g., gasoline, on the other hand, catalyst poisoning proceeds from the upstream-side catalyst unit, and it is preferable to increase cell density of the upstream-side catalyst unit, thereby compensating for decreased number of active sites by the poisoning. It should be noted, however, that pressure loss across the reformer may be excessive, when all of the catalyst units have a high cell density. It is therefore preferable that the downstream-side catalyst unit, which will be affected less by the poisonous material, has a lower cell density than the upstream-side one, to reduce the pressure loss. Satisfying the relationship (3) is desirable, also viewed from the above.

When the relationship (1) and relationship (2) or (3) are to be satisfied simultaneously, a combination of the catalyst units for the relationship (1) may be different from that for the relationship (2) or (3), but preferably they are the same.

Next, the reformer of the second invention is described.

The reformer as the second invention comprises two or more catalyst units of a honeycomb structure capable of generating hydrogen from a reactant fluid containing an organic compound or carbon monoxide, by catalysis, in the flow path.

In the reformer of the above configuration, when the reaction taking place in the catalyst unit is essentially exothermic or endothermic to release or absorb a large quantity of heat, or when the reactant is charged into the reactor at a high concentration, an undesirable phenomenon of rapid temperature change in the upstream catalyst unit (upstream-side catalyst unit) may occur, when it has an excessively high cell density, or excessively high contact efficiency with the fluid. For example, when the reaction is accompanied by absorption of a large quantity of heat, temperature at the upstream-side catalyst unit may rapidly decrease, to below an operational level for the catalyst. When the reaction is accompanied by release of a large quantity of heat, on the other hand, temperature may increase rapidly to deteriorate the catalyst or carrier. The stream flowing into the downstream catalyst unit (downstream-side catalyst unit) contains a lower concentration of the reactant, because it has been already treated to some extent by the upstream-side catalyst unit, and it is preferable to conversely increase cell density of the downstream-side catalyst unit, thereby increasing contact efficiency between the reactant and catalyst sites.

Viewed from the above, the reformer of the second invention is characterized by at least two of the heater units of a honeycomb structure satisfying the following relationship (4):

$$\text{Cell density of the upstream-side catalyst unit} \leq \text{Cell density of the downstream-side catalyst unit} \quad (4)$$

Figure 2:
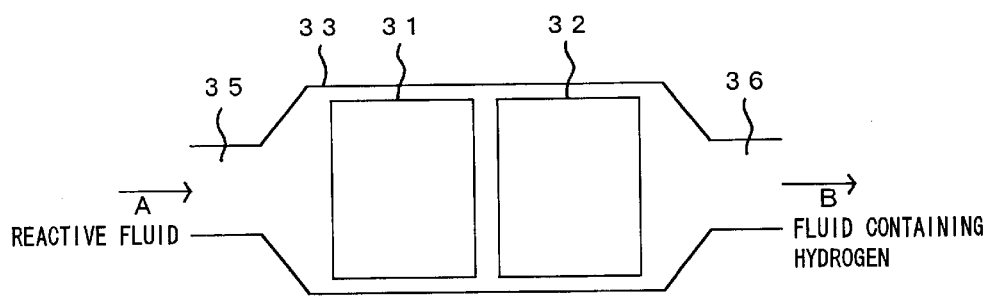
FIG. 2 is a schematic sectional view showing another embodiment of a reformer according to the second invention.

FIG. 2 is a schematic sectional view showing one embodiment of the reformer of the second invention. In FIG. 2, the reformer comprises an upstream-side catalyst unit 31, a downstream-side catalyst unit 32, disposed in a metallic casing 33 which forms a flow path of the reactant fluid. A reactant fluid A is fed into the reformer from an inlet 35, passes through the upstream-side catalyst unit 31, downstream-side catalyst 2, and reaches an outlet 36. A fluid B containing the hydrogen produced leaves the outlet 16 and is transferred to a fuel cell section disposed downstream of the reformer. Both upstream- and downstream-side catalyst units 31 and 32 are of honeycomb structure, their cell densities satisfying the relationship (4).

In the preferred embodiment shown in FIG. 2, two catalyst units are disposed in the flow path. However, three or more catalyst units may be disposed along the flow path. In such a case, the intended effect of the present invention can be secured when at least two of the catalyst units satisfy the relationship (4). The effect will be larger when the most upstream catalyst unit and at least one of the downstream catalyst units satisfy the relationship (4), or two catalyst units adjacent to each other satisfy the relationship (4), and still larger when the most upstream catalyst unit and the one adjacent thereto satisfy the relationship (4). It is most preferable that the most upstream catalyst unit and any of the downstream catalyst units satisfy the relationship (4).

For the reformer of the second invention, it is preferable that at least two catalyst units satisfy the following relationship (5), in addition to the above relationship of cell density:

$$\text{Heat capacity of the upstream catalyst unit} \leq \text{Heat capacity of the downstream catalyst unit} \quad (5)$$

In the reformer of the above configuration, in which two or more catalyst units are disposed, it is preferable that the upstream-side catalyst unit has a lower heat capacity than the downstream-side catalyst unit, to allow the upstream-side catalyst unit to be heated in a short time to an operational temperature level during the cold starting period and not to become a heat sink for the downstream-side catalyst unit. It is generally necessary to forcefully heat a reformer for hydrogen production by an adequate means, because heating of the reactor by the reactant stream per se may not be expected, unlike the case with exhaust gases from an internal combustion engine. A heat capacity design to help heat the catalyst unit, such as the one described above, is needed more by the reformer than by others.

When the upstream-side catalyst unit is for production of hydrogen, the stream flowing into the downstream-side catalyst unit contains hydrogen at a higher concentration than the one flowing into the upstream-side catalyst unit. It is therefore preferable that the downstream-side catalyst unit is designed to have a higher heat capacity than the upstream-side catalyst unit, to prevent the fluid stream from being heated excessively for safety consideration.

Heat capacity of the catalyst unit is determined by various factors, such as catalyst component materials (mainly heat-resistant oxide as the substrate for the catalyst metal(s)) and quantities, and material, structure and volume of the carrier. These factors are used, either singly or in combination, to produce the catalyst unit of desired heat capacity for the first invention.

When the relationships (4) and (5) are to be satisfied simultaneously, a combination of the catalyst units for the relationship (4) may be different from that for the relationship (5), but preferably they are the same.

Next, the reformer of the third invention is described.

The reformer as the third invention comprises two or more catalyst units of a honeycomb structure capable of generating hydrogen from a reactant fluid containing an organic compound or carbon monoxide, by catalysis, in the flow path.

In the reformer of the above configuration, it is preferable to increase cell density of the upstream-side catalyst unit, into which the stream of much higher reactant concentration flows, thereby increasing contact efficiency between the reactant and catalyst sites, when the reaction taking place in the catalyst unit is not so fast as combustion, in order to accelerate the reaction after temperature at the catalyst unit reaches an operational temperature for the unit.

When the reactant stream contains a poisonous material to the catalyst, e.g., gasoline, on the other hand, catalyst poisoning proceeds from the upstream-side catalyst unit, and it is preferable to increase cell density of the upstream-side catalyst unit, thereby compensating for decreased number of active sites by the poisoning. It should be noted, however, that pressure loss across the reformer may be excessive, when all of the catalyst units have a high cell density. It is therefore preferable that the downstream-side catalyst unit, which will be affected less by the poisonous material, has a lower cell density than the upstream-side one, to reduce the pressure loss.

Viewed from the above, the reformer of the third invention is characterized by at least two catalyst units of honeycomb structure satisfying the following relationship (6):

$$\text{Cell density of the upstream-side catalyst} \geq \text{cell density of the downstream-side catalyst unit} \quad (6)$$

Figure 3:
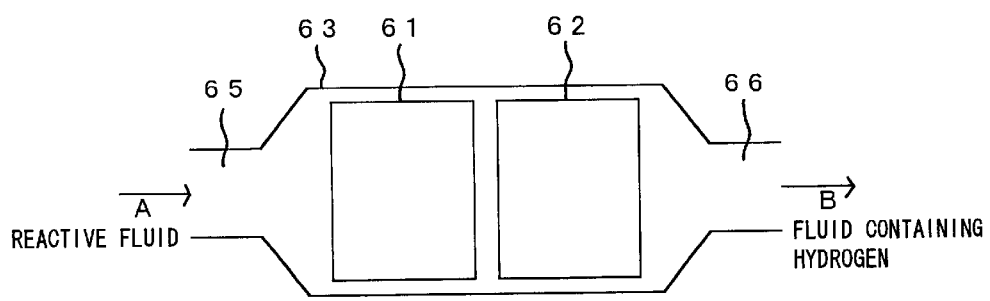
FIG. 3 is a schematic sectional view showing still another embodiment of a reformer according to the third invention.

FIG. 3 is a schematic sectional view showing one embodiment of the reformer of the third invention. In FIG. 3, the reformer comprises an upstream-side catalyst unit 6, a downstream-side catalyst unit 62, disposed in a metallic casing 63 which forms a flow path of the reactant fluid. A reactant fluid A is fed into the reformer from an inlet 65, passes through the upstream-side catalyst unit 61, downstream-side catalyst 2, and reaches an outlet 66. A fluid B containing the hydrogen produced leaves the outlet 26 and is transferred to a fuel cell section disposed downstream of the reformer. Both upstream- and downstream-side catalyst units 61 and 62 are of honeycomb structure, their cell densities satisfying the relationship (6).

In the preferred embodiment shown in FIG. 3, two catalyst units are disposed in the flow path. However, three or more catalyst units may be disposed along the flow path. In such a case, the intended effect of the present invention can be secured when at least two of the catalyst units satisfy the relationship (6). The effect will be larger when the most upstream catalyst unit and at least one of the downstream catalyst units satisfy the relationship (6), or two catalyst units adjacent to each other satisfy the relationship (6), and still larger when the most upstream catalyst unit and the one adjacent thereto satisfy the relationship (6). It is most preferable that the most upstream catalyst unit and any of the downstream catalyst units satisfy the relationship (6).

For the reformer of the third invention, it is preferable that at least two catalyst units satisfy the following relationship (7), in addition to the above relationship of cell density, for the same reason that satisfying the relationship (5) is desirable for the second invention:

$$\text{Heat capacity of the upstream catalyst unit} \leq \text{Heat capacity of the downstream catalyst unit} \quad (7)$$

When the relationships (6) and (7) are to be satisfied simultaneously, a combination of the catalyst units for the relationship (6) may be different from that for the relationship (7), but preferably they are the same.

In the first to the third inventions, there is used, as the starting material for obtaining hydrogen, a reactant fluid containing an organic compound such as hydrocarbon (e.g., butane or propane), or alcohol (e.g., methanol), or carbon monoxide (CO). A hydrocarbon is preferred in view of the transportation via a gas cylinder or pipe. In view of the handleability when mounted on an automobile, a gasoline or alcohol (e.g., methanol), which is a liquid and easy to mount, is preferred. However, the starting material for obtaining hydrogen is not restricted to these. CO is not preferred as the starting material, because it is a toxic gas.

The main reaction in the reformer of the first to the third inventions is a steam reforming reaction taking place in the presence of steam. Further, a CO shift reaction and selective CO oxidation reaction are allowed to take place to reduce CO (a by-product), in order to obtain high-purity hydrogen and alleviate the deactivation of the electrode of fuel cell by CO. An example of the reactions taking place when butane is used as a starting material, is shown below.

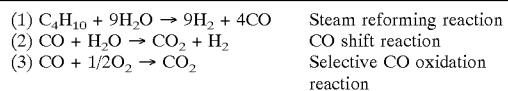

(1) $C_4H_{10} + 9H_2O \rightarrow 9H_2 + 4CO$  Steam reforming reaction
(2) $CO + H_2O \rightarrow CO_2 + H_2$  CO shift reaction
(3) $CO + 1/2O_2 \rightarrow CO_2$  Selective CO oxidation reaction Hydrogen can also be obtained by using a partial oxidation reaction in place of the steam reforming reaction.

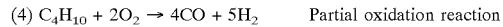

(4) $C_4H_{10} + 2O_2 \rightarrow 4CO + 5H_2$  Partial oxidation reaction

Following the above partial oxidation reaction, the above reactions (2) and (3) are allowed to proceed to increase the purity of hydrogen. The process for obtaining hydrogen based on the reaction (1) is called steam reforming, and the process for obtaining hydrogen based on the reaction (4) is called partial oxidation. Any of these processes is applicable to the first to the third inventions. Use of steam reforming or partial oxidation in hydrogen production is optional. For use in fuel cell mounted on an automobile, partial oxidation is drawing attention when gasoline is used as the starting material, and steam reforming is drawing attention when an alcohol (e.g., methanol) is used as the starting material. In general, steam reforming can produce high-purity hydrogen easily at lower temperature and is more efficient.

As the reaction for generating hydrogen from methanol, there are the following two reactions:

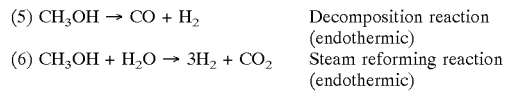

(5) $CH_3OH \rightarrow CO + H_2$  Decomposition reaction (endothermic)
(6) $CH_3OH + H_2O \rightarrow 3H_2 + CO_2$  Steam reforming reaction (endothermic)

In these reactions, different catalysts are generally used (the catalysts used are described later) and the reaction temperatures are also different. The reactions (1), (5) and (6) are generally endothermic, and require temperature of 500° C. or higher. The reactions (2) and (3) are exothermic, and are allowed to proceed at relatively low temperature of 300° C. or lower. The reaction (4) is exothermic and requires temperature of 500° C. or higher. To obtain high-purity hydrogen, the reactions (1) [or (5) or (6)], (2) and (3), or the reactions (4), (2) and (3) are conducted over respective catalysts being disposed in series in the flow path of a reactant fluid. Depending upon hydrogen purity required, it is possible to conduct only the reactions (1) [or (5) or (6)] or the reaction (4) in the reformer; when CO is used as the starting material, the reaction (2) and, as necessary, the reaction (3) are conducted.

The catalyst unit for the first to the third inventions contains at least one of the catalyst components having catalysis for the above-mentioned steam reforming, partial oxidation or decomposition, CO shift reaction, selective CO oxidation, etc. Of these, the selective CO oxidation reaction is for reduction in CO and has no direct relation to hydrogen production; however, when high-purity hydrogen is required, this reaction is important and allowed to proceed in the reformer, and the catalyst for the reaction is contained in the catalyst unit of the first to the third inventions.

As the catalyst for generating hydrogen from a reactant fluid containing an organic compound or CO, concrete examples of the preferable ones include a catalyst containing, as main components, a heat-resistant oxide and at least one kind of metal selected from the metal elements of groups VB to VIII, IB and IIB of the long-form periodic table.

As to the metal element effective for steam reforming, partial oxidation or decomposition, it is preferred to use a metal of group VIII as the essential metal element. The preferred metal elements are Ni, Rh, Ru, Ir, Pd, Pt, Co and Fe, and they are used singly or in combination. It is preferred to add thereto, as a promoter catalyst, V or Nb of group VB; Cr, Mo or W of group VIB; Mn or Re of group VIIB; or the like. Also, an alkaline earth metal may be added for prevention of carbonization. These metals are ordinarily loaded on a heat-resistant oxide, whereby the resulting catalyst can have an increased specific surface area, enhanced activity and durability to reaction temperature.

As the heat-resistant oxide, there can be used $Al_2O_3$, $SiO_2$, $TiO_2$, $ZrO_2$, MgO, zeolite, SAPO, ALPO, a layer structure compound or a compound oxide thereof. Of these oxides, one having a specific surface area of ordinarily 5 to 300 m$^2$/g is used. The heat-resistant oxide and the above-mentioned metal component are made into a uniform mixture by a known means such as chemical method (e.g., immersion, coprecipitation or sol-gel), physical mixing or the like. Specific surface of the synthesized catalyst is generally in a range from 5 to 300 m$^2$/g. A specific surface area below 5 m$^2$/g invites reduced activity, and that above 300 m$^2$/g invites striking property change at high temperature and resultant reduction in durability.

As the heat-resistant oxide, alumina ($Al_2O_3$) can be preferably used because it is relatively inexpensive and has a high specific surface area even at high temperature. There can also be used spinel obtained by adding magnesia to alumina, or magnesia (which is a basic carrier) per se or a compound oxide thereof for suppressing carbonization.

The proportion of the catalyst metal added to the heat-resistant oxide is preferably 1 to 30% by weight. When the catalyst metal is a noble metal, addition of up to about 10% by weight is sufficient because the noble metal has a high activity. When the catalyst metal is a base metal such as Ni, addition of 10 to 30% by weight is preferred.

As the catalyst appropriate for CO shift reaction, there is often used Fe or Co of group VIII, Cu of group IB, Zn of group IIB, or the like. The metal elements specified in the present invention show a fairly high activity for CO shift reaction. Since the metals showing an activity at relatively low temperature include Cu, Zn or both, loading of such a metal or metal combination on the above-mentioned heat-resistant oxide (e.g., alumina) can assure high heat-resistance. In such a case, amount of the metal added to the heat-resistant oxide is preferably 10 to 50% by weight. When the CO shift reaction is conducted at relatively high temperature, spinel (e.g., Fe—Cr) per se can also be used.

As the catalyst appropriate for selective CO oxidation reaction, there can be mentioned metals such as Mn of group VII, Co and noble metals of group VIII, Cu, Ag and Au of group IB and the like. They can be used ordinarily by being loaded on the above-mentioned heat-resistant oxide. The catalyst need not oxidize hydrogen produced, and Pt or the like having a strong interactions with CO can be used. A hopcalite catalyst is also one of the preferred catalysts.

The catalyst unit is of a honeycomb structure for the second and third inventions. It is preferable to use a honeycomb structure also for the first invention, viewed from pressure loss and mechanical strength, although beads, pellets, rings, and others may be used. The term "honeycomb structure" means a structure having a number of through-holes (cells) separated by a partition from each other. When the catalyst unit is used in the form of a honeycomb structure, it may be made of a catalyst component(s) per se, or may be obtained by loading a catalyst component(s) on a honeycomb carrier made of an inert material such as cordierite, mullite or the like. The suitable materials for the honeycomb carrier include ceramics (e.g., cordierite and mullite), foil-shaped metals composed of heat-resistant stainless steel (e.g., Fe—Cr—Al alloy), and metallic materials formed into a honeycomb structure by powder metallurgy. The honeycomb carrier is preferably porous, whether it is of a ceramic or metal, for reduced heat capacity and improved catalyst-loading characteristics. Its porosity is preferably in a range from 0.5 to 50%, more preferably 10 to 40%.

The catalyst unit of a honeycomb structure for the second and third inventions, and also for the first invention when it is used, preferably has a cell density of 4 to 2000 cells/in$^2$ (cpsi), more preferably 50 to 1500 cpsi. Cell density below 4 cpsi may invite insufficient contact efficiency and hence insufficient unit function (catalytic reaction). Cell density above 2000 cpsi, on the other hand, may invite an excessive pressure loss. The cell section can be of any shape, e.g., circular, square, polygonal or corrugated. When the catalyst component is coated on the honeycomb carrier in the form of coating layer, thickness of the coating layer is preferably in a range from 5 to 100 micron. Thickness below 5 micron may invite catalyst deactivation, whereas that above 100 micron increased pressure loss.

The catalyst unit may be obtained by loading respective catalysts (e.g., those for steam reforming and CO shift reaction) on different areas of one honeycomb structure; however, since each catalyst has a different operating temperature, it is preferred to arrange a plurality of catalyst units, each containing a different catalyst, in the reformer. This configuration allows a heat-exchanger for heat recovery, inlet port for auxiliary oxygen needed by selective CO oxidation, and other members to be disposed more easily. Two or more catalyst units carrying the same type of the catalyst component may be disposed in the reformer. The catalyst components for the upstream-side and downstream-side catalyst units, which satisfy the relationship (1), (4) or (6), may be the same or different.

The present invention is described in more detail by EXAMPLES, which by no means limit the present invention.

EXAMPLES and

Comparative Example for the First Invention

[Production of Catalyst Units]

The catalyst units A1 to O1 were produced by the following procedures. All of the catalyst units had a common quantity of the catalyst component (catalyst metal and $Al_2O_3$) per unit volume of the honeycomb structure. Since $Al_2O_3$ accounted for most of the catalyst component, its heat capacity per unit volume of the honeycomb structure on which it was loaded was essentially the same.

(Catalyst Unit A1)

Commercial $\gamma$-$Al_2O_3$ having a specific surface area of 200 m$^2$/g was impregnated with an aqueous solution containing Ru, dried and sintered at 600° C., to prepare the Ru-impregnated $Al_2O_3$ powder, which was mixed with adequate quantities of water and acetic acid, and shredded under the wet condition into the slurry. The slurry was loaded on a carrier of honeycomb structure (cell density: 400 cpsi, volume: 1.0 L, outer diameter: 93 mm, thickness of partition wall: 0.15 mm (approximately 6 mil), cell shape: hexagonal) of cordierite (NGK Insulators, Ltd.). The slurry-loaded honeycomb structure was sintered at 600° C., to produce the catalyst unit A1 carrying the catalyst component for steam reforming.

(Catalyst Unit B1)

The catalyst unit B1 of honeycomb structure carrying the catalyst component for steam reforming was produced in a manner similar to that for the catalyst unit A1, except that the honeycomb structure on which the slurry was loaded had a volume of 0.7 L.

(Catalyst Unit C1)

The catalyst unit C1 of honeycomb structure carrying the catalyst component for steam reforming was produced in a manner similar to that for the catalyst unit A1, except that the honeycomb structure on which the slurry was loaded had a volume of 0.5 L.

(Catalyst Unit D1)

The catalyst unit D1 of honeycomb structure carrying the catalyst component for steam reforming was produced in a manner similar to that for the catalyst unit A1, except that the honeycomb structure on which the slurry was loaded had a volume of 0.3 L.

(Catalyst Unit E1)

The catalyst unit E1 of honeycomb structure carrying the catalyst component for steam reforming was produced in a manner similar to that for the catalyst unit A1, except that the honeycomb structure on which the slurry was loaded had the thickness of portion wall of 0.1 mm (approximately 4 mil).

(Catalyst Unit F1)

The catalyst unit F1 of honeycomb structure carrying the catalyst component for steam reforming was produced in a manner similar to that for the catalyst unit A1, except that the honeycomb structure on which the slurry was loaded had the thickness of portion wall of 0.1 mm (approximately 4 mil), volume 0.5 L.

(Catalyst Unit G1)

The catalyst unit G1 of honeycomb structure carrying the catalyst component for steam reforming was produced in a manner similar to that for the catalyst unit A1, except that the honeycomb structure on which the slurry was loaded had a cell density of 450 cpsi and volume of 0.3 L.

(Catalyst Unit H1)

The catalyst unit H1 of honeycomb structure carrying the catalyst component for stream reforming was produced in a manner similar to that for the catalyst unit A1, except that the honeycomb structure on which the slurry was loaded had a cell density of 350 cpsi, volume 0.3 L.

(Catalyst Unit I1)

Commercial $\gamma$-$Al_2O_3$ having a specific surface area of 200 m$^2$/g was impregnated with an aqueous solution containing copper acetate and another aqueous solution containing zinc acetate, dried and sintered at 500° C., to prepare the Cu/Zn-impregnated Al₂O₃ powder, which was mixed with adequate quantities of water and acetic acid, and shredded under the wet condition into the slurry. The slurry was loaded on a carrier of honeycomb structure (cell density: 400 cpsi, volume: 1.0 L, outer diameter: 93 mm, thickness of partition wall: 0.15 mm (approximately 6 mil), cell shape: hexagonal) of cordierite (NGK Insulators, Ltd.). The slurry-loaded honeycomb structure was sintered at 500° C., to produce the catalyst unit I1 carrying the catalyst component for CO shift reaction.

(Catalyst Unit J1)

The catalyst unit J1 of honeycomb structure carrying the catalyst component for CO shift reaction was produced in a manner similar to that for the catalyst unit I1, except that the honeycomb structure on which the slurry was loaded had a thickness of partition wall of 0.1 mm (approximately 4 mil).

(Catalyst Unit K1)

The catalyst unit K1 of honeycomb structure carrying the catalyst component for CO shift reaction was produced in a manner similar to that for the catalyst unit I1, except that the honeycomb structure on which the slurry was loaded had a cell density of 350 cpsi.

(Catalyst Unit L1)

The same slurry as that used for producing the catalyst unit A1 was loaded on the upper half of a carrier of honeycomb structure (cell density: 400 cpsi, volume: 2.0 L, outer diameter: 93 mm, thickness of partition wall: 0.15 mm (approximately 6 mil), cell shape: hexagonal) of cordierite (NGK Insulator, Ltd.), and the same slurry as that used for producing the catalyst unit I1 was loaded on the lower half of the above carrier. The slurry-loaded honeycomb structure was sintered at 500° C., to produce the catalyst unit L1 carrying the catalyst components for steam reforming and CO shift reaction at different positions on the same carrier.

(Catalyst Unit M1)

Commercial γ-Al₂O₃ having a specific surface area of 200 m²/g was impregnated with an aqueous solution containing H₂PtCl₅, dried and sintered at 500° C., to prepare the Pt-impregnated Al₂O₃ powder, which was mixed with adequate quantities of water and acetic acid, and shredded under the wet condition into the slurry. The slurry was loaded on a carrier of honeycomb structure (cell density: 400 cpsi, volume: 1.0 L, outer diameter: 93 mm, thickness of partition wall: 0.15 mm (approximately 6 mil), cell shape: hexagonal) of cordierite (NGK Insulator, Ltd.). The slurry-loaded honeycomb structure was sintered at 500° C., to produce the catalyst unit M1 carrying the catalyst component for selective CO oxidation.

(Catalyst Unit N1)

The catalyst unit N1 of honeycomb structure carrying the catalyst component for selective CO oxidation was produced in a manner similar to that for the catalyst unit M1, except that the honeycomb structure on which the slurry was loaded had a cell density of 450 cpsi.

(Catalyst Unit O1)

The catalyst unit O1 of honeycomb structure carrying the catalyst component for selective CO oxidation was produced in a manner similar to that for the catalyst unit M1, except that the honeycomb structure on which the slurry was loaded had a cell density of 350 cpsi.

[Configuration of Reformers]

The reformers of the following configurations were produced using the catalyst units described above. The notation numbers in the drawings in parentheses are attached to each of the catalyst units, to clearly distinguish the heater unit/ catalyst unit types from notation numbers.

(Reformer A1)

Figure 4:
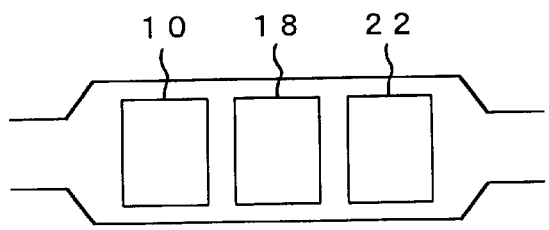
FIG. 4 is a schematic sectional view of the reformer of one embodiment of the first invention, used in EXAMPLE.

The reformer A1 comprised the catalyst unit A1(10), catalyst unit I1(18) and catalyst unit M1(22) in this order in the flow path from the upstream (FIG. 4). The following relationship held with respect to heat capacity:

Catalyst unit A1=Catalyst unit I1=Catalyst unit M1

(Reformer B1)

Figure 5:
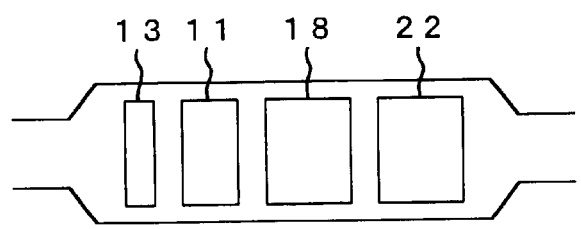
FIG. 5 is a schematic sectional view of the reformer of another embodiment of the first invention, used in EXAMPLE.

The reformer B1 comprised the catalyst unit D1(13), catalyst unit B1(11), catalyst unit I1(18) and catalyst unit M1(22) in this order in the flow path from the upstream (FIG. 5). The following relationship held with respect to heat capacity:

Catalyst unit D1<Catalyst unit B1<Catalyst unit I1=Catalyst unit M1

(Reformer C1)

Figure 6:
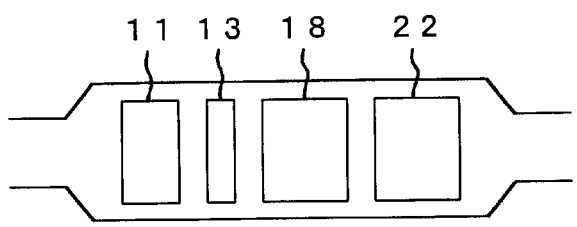
FIG. 6 is a schematic sectional view of the reformer of still another embodiment of the first invention, used in EXAMPLE.

The reformer C1 comprised the catalyst unit B1(11), catalyst unit D1(13), catalyst unit I1(18) and catalyst unit M1(22) in this order in the flow path from the upstream (FIG. 6). The following relationship held with respect to heat capacity:

Catalyst unit B1>Catalyst unit D1<Catalyst unit I1=Catalyst unit M1

(Reformer D1)

Figure 7:
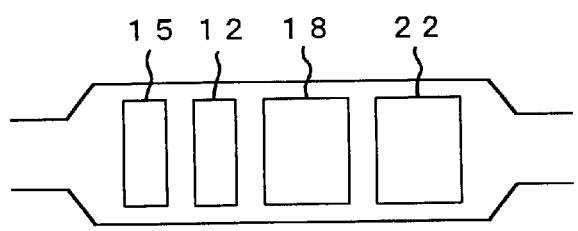
FIG. 7 is a schematic sectional view of the reformer of still another embodiment of the first invention, used in EXAMPLE.

The reformer D1 comprised the catalyst unit F1(15), catalyst unit C1(12), catalyst unit I1(18) and catalyst unit M1(22) in this order in the flow path from the upstream (FIG. 7). The following relationship held with respect to heat capacity:

Catalyst unit F1<Catalyst unit C1<Catalyst unit I1=Catalyst unit M1

(Reformer E1)

Figure 8:
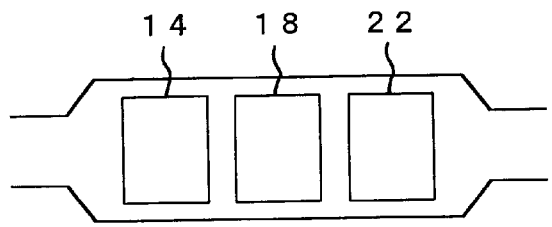
FIG. 8 is a schematic sectional view of the reformer of still another embodiment of the first invention, used in EXAMPLE.

The reformer E1 comprised the catalyst unit E1(14), catalyst unit I1(18) and catalyst unit M1(22) in this order in the flow path from the upstream (FIG. 8). The following relationship held with respect to heat capacity:

Catalyst unit E1<Catalyst unit I1=Catalyst unit M1

(Reformer F1)

Figure 9:
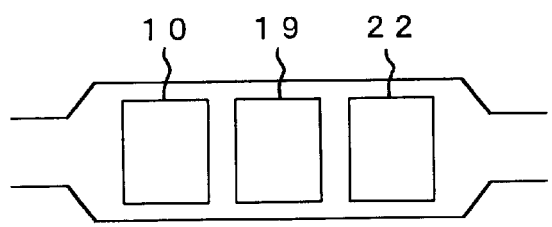
FIG. 9 is a schematic sectional view of the reformer of still another embodiment of the first invention, used in EXAMPLE.

The reformer F1 comprised the catalyst unit A1(10), catalyst unit J1(19) and catalyst unit M1(22) in this order in the flow path from the upstream (FIG. 9). The following relationship held with respect to heat capacity:

Catalyst unit A1>Catalyst unit J1<Catalyst unit M1

(Reformer G1)

Figure 10:
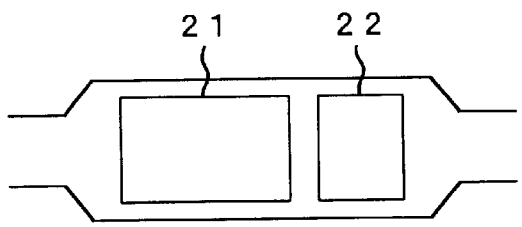
FIG. 10 is a schematic sectional view of the reformer of comparative embodiment of the first invention, used in EXAMPLE.

The reformer G1 comprised the catalyst unit L1(21) and catalyst unit M1(22) in this order in the flow path from the upstream (FIG. 10). The following relationship held with respect to heat capacity:

Catalyst unit L1>Catalyst unit M1

(Reformer H1)

Figure 11:
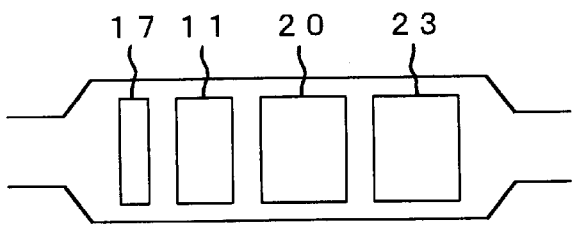
FIG. 11 is a schematic sectional view of the reformer of still another embodiment of the first invention, used in EXAMPLE.

The reformer H1 comprised the catalyst unit H1(17), catalyst unit B1(11), catalyst unit K1(20) and catalyst unit N1(23) in this order in the flow path from the upstream (FIG. 11). The following relationship held with respect to heat capacity:

Catalyst unit H1<Catalyst unit B1<Catalyst unit K1<Catalyst unit N1

(Reformer I1)

Figure 12:
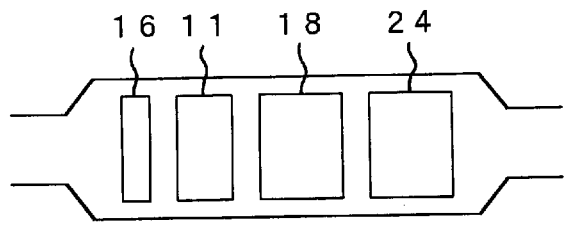
FIG. 12 is a schematic sectional view of the reformer of still another embodiment of the first invention, used in EXAMPLE.

The reformer I1 comprised the catalyst unit G1(16), catalyst unit B1(11), catalyst unit I1(18) and catalyst unit O1(24) in this order in the flow path from the upstream (FIG. 12). The following relationship held with respect to heat capacity:

Catalyst unit G1<Catalyst unit B1<Catalyst unit I1>Catalyst unit O1

[Assessment of Reformers]

Methanol ($CH_3OH$) and $H_2O$ were fed at constant rates to each of the reformers A1 to I1, where steam carbon ratio (S/C) of the feed stream was set at 2.0. The feed stream was preheated to 600° C. beforehand. For the reformer simultaneously having the catalyst unit carrying the catalyst component for CO shift reaction and that carrying the catalyst component for selective CO oxidation, air was fed to the system between these catalyst units, to supply oxygen required by the latter.

Each catalyst unit was operated for 100 h continuously, then stopped, and allowed to cool sufficiently. It was then restarted, and conversion of methanol attained for 3 min (including time for cold starting) was measured, where the conversion was determined by dividing a total mol number of CO and $CO_2$ formed by mol number of methanol fed. The conversion, used as a measure of hydrogen production efficiency, for each reformer is given in Table 1. Concentration of CO in the effluent gas was used as a measure of CO abatement efficiency for the catalyst unit carrying the catalyst component for CO shift reaction and that carrying the catalyst component for selective CO oxidation. It was measured 1 and 3 min after supply of the starting mixture was started, to assess cold starting capacity of the reformer. The results are also given in Table 1. The feed stream for each of EXAMPLES 7 and 9 was 5 times as large as that for each of EXAMPLES 1 to 6 and COMPARATIVE EXAMPLE 1, and the feed stream for each of EXAMPLES 8 and 10 was 1/5 times as large as that for each of EXAMPLES 1 to 6 and COMPARATIVE EXAMPLE 1.

EXAMPLES and

Comparative Example for the Second Invention
[Production of Catalyst Units]

The catalyst units A2 to O2 were produced by the following procedures. All of the catalyst units had a common quantity of the catalyst component (catalyst metal and $Al_2O_3$) per unit volume of the honeycomb structure. Since $Al_2O_3$ accounted for most of the catalyst component, its heat capacity per unit volume of the honeycomb structure on which it was loaded was essentially the same.

(Catalyst Unit A2)

Commercial γ-$Al_2O_3$ having a specific surface area of 200 $m^2$/g was impregnated with an aqueous solution containing Ru, dried and sintered at 600° C., to prepare the Ru-impregnated $Al_2O_3$ powder, which was mixed with adequate quantities of water and acetic acid, and shredded under the wet condition into the slurry. The slurry was loaded on a carrier of honeycomb structure (cell density: 400 cpsi, volume: 1.0 L, outer diameter: 93 mm, thickness of partition wall: 0.15 mm (approximately 6 mil), cell shape: hexagonal) of cordierite (NGK Insulators, Ltd.). The slurry-loaded honeycomb structure was sintered at 600° C., to produce the catalyst unit A1 carrying the catalyst component for steam reforming.

(Catalyst Unit B2)

The catalyst unit B2 of honeycomb structure carrying the catalyst component for steam reforming was produced in a manner similar to that for the catalyst unit A2, except that the honeycomb structure on which the slurry was loaded had a volume of 0.7 L.

(Catalyst Unit C2)

The catalyst unit C2 of honeycomb structure carrying the catalyst component for steam reforming was produced in a manner similar to that for the catalyst unit A2, except that the honeycomb structure on which the slurry was loaded had a volume of 0.5 L.

(Catalyst Unit D2)

The catalyst unit D2 of honeycomb structure carrying the catalyst component for steam reforming was produced in a

TABLE 1

| | Reformer | Conversion of Methanol (%) | Concentration of CO in Effluent Gas (ppm) | | Remarks |
|---|---|---|---|---|---|
| | | | in 1 min | in 3 min | |
| EXAMPLE 1 | A1 | 70 | 60 | 15 | |
| EXAMPLE 2 | B1 | 78 | 50 | 10 | |
| EXAMPLE 3 | C1 | 69 | 60 | 15 | |
| EXAMPLE 4 | D1 | 77 | 50 | 10 | |
| EXAMPLE 5 | E1 | 72 | 55 | 10 | |
| EXAMPLE 6 | F1 | 68 | 65 | 15 | |
| COMPARATIVE EXAMPLE 1 | G1 | 63 | 90 | 30 | |
| EXAMPLE 7 | H1 | 84 | 45 | 10 | The feed stream for this EXAMPLE was 5 times as large as that for each of EXAMPLES 1 to 6 and COMPARATIVE EXAMPLE 1. |
| EXAMPLE 8 | H1 | 73 | 50 | 10 | The feed stream for this EXAMPLE was 1/5 times as large as that for each of EXAMPLES 1 to 6 and COMPARATIVE EXAMPLE 1. |
| EXAMPLE 9 | I1 | 74 | 70 | 20 | The feed stream for this EXAMPLE was 5 times as large as that for each of EXAMPLES 1 to 6 and COMPARATIVE EXAMPLE 1. |
| EXAMPLE 10 | I1 | 87 | 25 | 5 | The feed stream for this EXAMPLE was 1/5 times as large as that for each of EXAMPLES 1 to 6 and COMPARATIVE EXAMPLE 1. | manner similar to that for the catalyst unit A2, except that the honeycomb structure on which the slurry was loaded had a volume of 0.3 L.

(Catalyst Unit E2)

The catalyst unit E2 of honeycomb structure carrying the catalyst component for steam reforming was produced in a manner similar to that for the catalyst unit A2, except that the honeycomb structure on which the slurry was loaded had the thickness of portion wall of 0.1 mm (approximately 4 mil).

(Catalyst Unit F2)

The catalyst unit F2 of honeycomb structure carrying the catalyst component for steam reforming was produced in a manner similar to that for the catalyst unit A2, except that the honeycomb structure on which the slurry was loaded had the cell density of 450 cpsi.

(Catalyst Unit G2)

The catalyst unit G2 of honeycomb structure carrying the catalyst component for steam reforming was produced in a manner similar to that for the catalyst unit A2, except that the honeycomb structure on which the slurry was loaded had a cell density of 450 cpsi and volume of 0.5 L.

(Catalyst Unit H2)

The catalyst unit H2 of honeycomb structure carrying the catalyst component for stream reforming was produced in a manner similar to that for the catalyst unit A2, except that the honeycomb structure on which the slurry was loaded had a cell density of 350 cpsi, volume 0.7 L.

(Catalyst Unit I2)

The catalyst unit I2 of honeycomb structure carrying the catalyst component for stream reforming was produced in a manner similar to that for the catalyst unit A2, except that the honeycomb structure on which the slurry was loaded had a cell density of 350 cpsi, volume 0.5 L.

(Catalyst Unit J2)

The catalyst unit J2 of honeycomb structure carrying the catalyst component for stream reforming was produced in a manner similar to that for the catalyst unit A2, except that the honeycomb structure on which the slurry was loaded had a cell density of 350 cpsi, volume 0.3 L.

(Catalyst Unit K2)

Commercial γ-$Al_2O_3$ having a specific surface area of 200 $m^2$/g was impregnated with an aqueous solution containing copper acetate and another aqueous solution containing zinc acetate, dried and sintered at 500° C., to prepare the Cu/Zn-impregnated $Al_2O_3$ powder, which was mixed with adequate quantities of water and acetic acid, and shredded under the wet condition into the slurry. The slurry was loaded on a carrier of honeycomb structure (cell density: 400 cpsi, volume: 1.0 L, outer diameter: 93 mm, thickness of partition wall: 0.15 mm (approximately 6 mil), cell shape: hexagonal) of cordierite (NGK Insulators, Ltd.). The slurry-loaded honeycomb structure was sintered at 500° C., to produce the catalyst unit K2 carrying the catalyst component for CO shift reaction.

(Catalyst Unit L2)

The catalyst unit L2 carrying the catalyst component for CO shift reaction was produced in a manner similar to that for the catalyst unit K2, except that thickness of the partition wall of the honeycomb structure, on which the slurry was loaded, was 0.1 mm (approximately 4 mil).

(Catalyst Unit M2)

Commercial γ-$Al_2O_3$ having a specific surface area of 200 $m^2$/g was impregnated with an aqueous solution containing $H_2PtCl_5$, dried and sintered at 500° C., to prepare the Pt-impregnated $Al_2O_3$ powder, which was mixed with adequate quantities of water and acetic acid, and shredded under the wet condition into the slurry. The slurry was loaded on the honeycomb structure (cell density: 400 cpsi, volume: 1.0 L, outer diameter: 93 mm, thickness of partition wall: 0.15 mm (approximately 6 mil), cell shape: hexagonal) of cordierite (NGK Insulators, Ltd.). The slurry-loaded a honeycomb structure was sintered at 500° C., to produce the catalyst unit M2 carrying the catalyst component for selective CO oxidation.

(Catalyst Unit N2)

The catalyst unit N2 carrying the catalyst component for selective CO oxidation was produced in a manner similar to that for the catalyst unit M2, except that the honeycomb structure on which the slurry was loaded had a cell density of 450 cpsi.

(Catalyst Unit O2)

The catalyst unit O2 carrying the catalyst component for selective CO oxidation was produced in a manner similar to that for the catalyst unit M2, except that the honeycomb structure on which the slurry was loaded had a cell density of 350 cpsi.

[Configuration of Reformers]

The reformers of the following configurations were produced using the catalyst units described above. The notation numbers in the drawings in parentheses are attached to the catalyst units, to clearly distinguish the catalyst unit types from notation numbers.

(Reformer A2)

Figure 13:
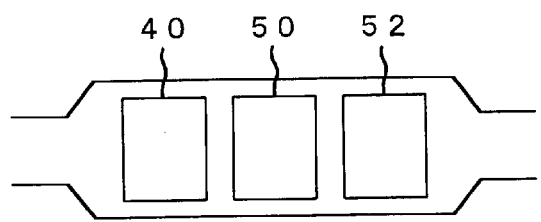
FIG. 13 is a schematic sectional view of the reformer of still another embodiment of the second invention, used in EXAMPLE.

The reformer A2 comprised the catalyst unit A2(40), catalyst unit K2(50) and catalyst unit M2(52) in this order in the flow path from the upstream (FIG. 13). The following relationships held with respect to cell density and heat capacity:

Cell density: Catalyst unit $A2$=Catalyst unit $K2$=Catalyst unit $M2$

Heat capacity: Catalyst unit $A2$=Catalyst unit $K2$=Catalyst unit $M2$ (Reformer B2)

Figure 14:
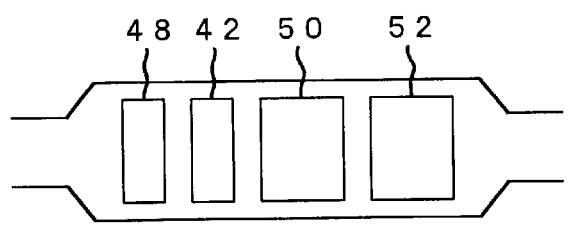
FIG. 14 is a schematic sectional view of the reformer of still another embodiment of the second invention, used in EXAMPLE.

The reformer B2 comprised the catalyst unit I2(48), catalyst unit C2(42), catalyst unit K2(50) and catalyst unit M2(52) in this order in the flow path from the upstream (FIG. 14). The following relationships held with respect to cell density and heat capacity:

Cell density: Catalyst unit $I2$<Catalyst $C2$=Catalyst unit $K2$=Catalyst unit $M2$ Heat capacity: Catalyst unit $I2$<Catalyst $C2$<Catalyst unit $K2$=Catalyst unit $M2$ (Reformer C2)

Figure 15:
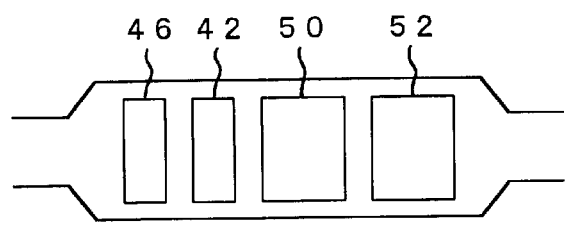
FIG. 15 is a schematic sectional view of the reformer of still another embodiment of the second invention, used in EXAMPLE.

The reformer C2 comprised the catalyst unit G2(46), catalyst unit C2(42), catalyst unit K2(50) and catalyst unit M2(52) in this order in the flow path from the upstream (FIG. 15). The following relationships held with respect to cell density and heat capacity:

Cell density: Catalyst unit $G2$>Catalyst $C2$=Catalyst unit $K2$=Catalyst unit $M2$ Heat capacity: Catalyst unit $G2$>Catalyst $C2$<Catalyst unit $K2$=Catalyst unit $M2$ (Reformer D2)

Figure 16:
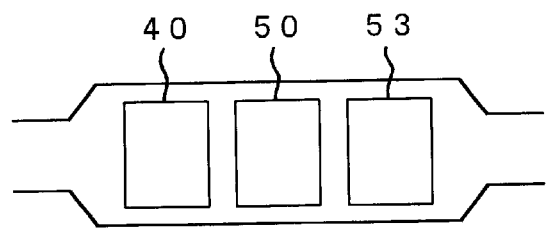
FIG. 16 is a schematic sectional view of the reformer of still another embodiment of the second invention, used in EXAMPLE.

The reformer D2 comprised the catalyst unit A2(40), catalyst unit K2(50) and catalyst unit N2(53) in this order in the flow path from the upstream (FIG. 16). The following relationships held with respect to cell density and heat capacity:

Cell density: Catalyst unit $A2$=Catalyst unit $K2$<Catalyst unit $N2$

Heat capacity: Catalyst unit $A2$=Catalyst unit $K2$<Catalyst unit $N2$ (Reformer E2)

Figure 17:
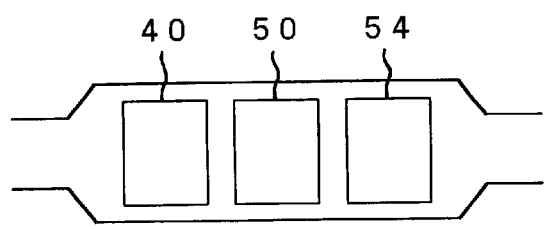
FIG. 17 is a schematic sectional view of the reformer of still another embodiment of the second invention, used in EXAMPLE.

The reformer E2 comprised the catalyst unit A2(40), catalyst unit K2(50) and catalyst unit O2(54) in this order in the flow path from the upstream (FIG. 17). The following relationships held with respect to cell density and heat capacity:

Cell density: Catalyst unit $A2$=Catalyst unit $K2$>Catalyst unit $O2$

Heat capacity: Catalyst unit $A2$=Catalyst unit $K2$>Catalyst unit $O2$ (Reformer F2)

Figure 18:
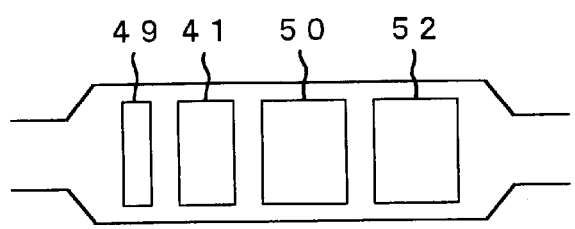
FIG. 18 is a schematic sectional view of the reformer of still another embodiment of the second invention, used in EXAMPLE.

The reformer F2 comprised the catalyst unit J2(49), catalyst unit B2(41), catalyst unit K2(50) and catalyst unit M2(52) in this order in the flow path from the upstream (FIG. 18). The following relationships held with respect to cell density and heat capacity:

Cell density: Catalyst unit $J2$<Catalyst $B2$=Catalyst unit $K2$=Catalyst unit $M2$ Heat capacity: Catalyst unit $J2$<Catalyst $B2$<Catalyst unit $K2$=Catalyst unit $M2$ (Reformer G2)

Figure 19:
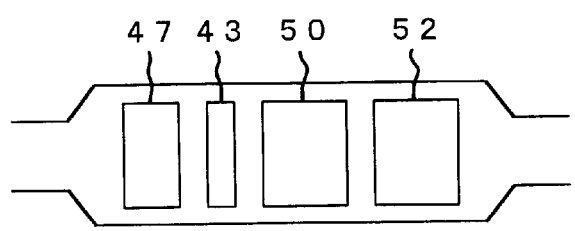
FIG. 19 is a schematic sectional view of the reformer of still another embodiment of the second invention, used in EXAMPLE.

The reformer G2 comprised the catalyst unit H2(47), catalyst unit D2(43), catalyst unit K2(50) and catalyst unit M2(52) in this order in the flow path from the upstream (FIG. 19). The following relationships held with respect to cell density and heat capacity:

Cell density: Catalyst unit $H2$<Catalyst $D2$=Catalyst unit $K2$=Catalyst unit $M2$ Heat capacity: Catalyst unit $H2$>Catalyst $D2$<Catalyst unit $K2$=Catalyst unit $M2$ (Reformer H2)

Figure 20:
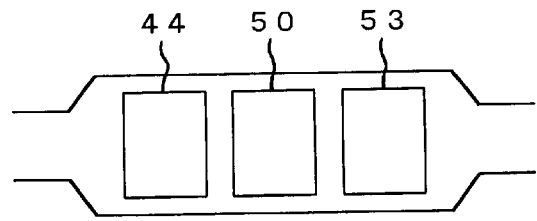
FIG. 20 is a schematic sectional view of one embodiment of the reformer of the second invention, used in EXAMPLE.

The reformer H2 comprised the catalyst unit E2(44), catalyst unit K2(50) and catalyst unit N2(53) in this order in the flow path from the upstream (FIG. 20). The following relationships held with respect to cell density and heat capacity:

Cell density: Catalyst unit $E2$=Catalyst unit $K2$<Catalyst unit $N2$

Heat capacity: Catalyst unit $E2$<Catalyst unit $K2$<Catalyst unit $N2$ (Reformer I2)

Figure 21:
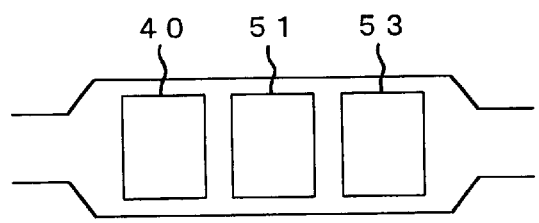
FIG. 21 is a schematic sectional view of another embodiment of the reformer of the second invention, used in EXAMPLE.

The reformer I2 comprised the catalyst unit A2(40), catalyst unit L2(51) and catalyst unit N2(53) in this order in the flow path from the upstream (FIG. 21). The following relationships held with respect to cell density and heat capacity:

Cell density: Catalyst unit $A2$=Catalyst unit $L2$<Catalyst unit $N2$

Heat capacity: Catalyst unit $A2$>Catalyst unit $L2$<Catalyst unit $N2$ (Reformer J2)

Figure 22:
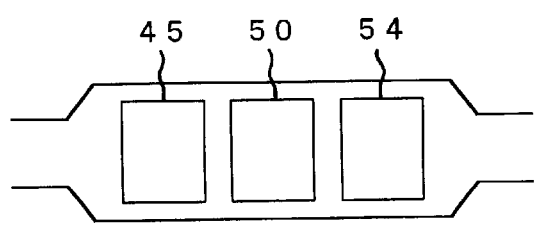
FIG. 22 is a schematic sectional view of a reformer, used in COMPARATIVE EXAMPLE, to be compared with the reformer of the second invention.

The reformer J2 comprised the catalyst unit F2(45), catalyst unit K2(50) and catalyst unit O2(54) in this order in the flow path from the upstream (FIG. 22). The following relationships held with respect to cell density and heat capacity:

Cell density: Catalyst unit $F2$>Catalyst unit $K2$>Catalyst unit $O2$

Heat capacity: Catalyst unit $F2$>Catalyst unit $K2$>Catalyst unit $O2$

[Assessment of Reformers]

Methanol ($CH_3OH$) and $H_2O$ were fed at constant rates to each of the reformers A2 to J2, where steam carbon ratio (S/C) of the feed stream was set at 2.0. The feed stream was preheated to 600° C. beforehand. For the reformer simultaneously having the catalyst unit carrying the catalyst component for CO shift reaction and that carrying the catalyst component for selective CO oxidation, air was fed to the system between these catalyst units, to supply oxygen required by the latter.

Each catalyst unit was operated for 100 h continuously, then stopped, and allowed to cool sufficiently. It was then restarted, and conversion of methanol attained for 3 min (including time for cold starting) was measured, where the conversion was determined by dividing a total mol number of CO and $CO_2$ formed by mol number of methanol fed. The conversion, used as a measure of hydrogen production efficiency, for each reformer is given in Table 2.

Concentration of CO in the effluent gas was used as a measure of CO abatement efficiency for the catalyst unit carrying the catalyst component for CO shift reaction and that carrying the catalyst component for selective CO oxidation. It was measured 1 and 3 min after supply of the starting mixture was started, to assess cold starting capacity of the reformer. The results are also given in Table 2.

TABLE 2

|  |  |  | Concentration of CO in Effluent Gas (ppm) | |
|---|---|---|---|---|
|  | Reformer | Conversion of Methanol (%) | in 1 min | in 3 min |
| EXAMPLE 11 | A2 | 70 | 70 | 20 |
| EXAMPLE 12 | B2 | 82 | 75 | 20 |
| COMPARATIVE EXAMPLE 13 | C2 | 61 | 60 | 10 |
| EXAMPLE 14 | D2 | 72 | 50 | 10 |
| EXAMPLE 15 | E2 | 68 | 85 | 30 |
| EXAMPLE 16 | F2 | 85 | 75 | 20 |
| EXAMPLE 17 | G2 | 80 | 55 | 10 |
| EXAMPLE 18 | H2 | 78 | 55 | 10 |
| EXAMPLE 19 | I2 | 67 | 55 | 10 |
| COMPARATIVE EXAMPLE 2 | J2 | 53 | 90 | 35 |

EXAMPLES and

Comparative Example for the Third Invention

[Production of Catalyst Units]

The catalyst units A3 to R3 were produced by the following procedures. All of the catalyst units had a common quantity of the catalyst component (catalyst metal and $Al_2O_3$) per unit volume of the honeycomb structure. Since $Al_2O_3$ accounted for most of the catalyst component, its heat capacity per unit volume of the honeycomb structure on which it was loaded was essentially the same.

(Catalyst Unit A3)

Commercial $\gamma$-$Al_2O_3$ having a specific surface area of 200 $m^2$/g was impregnated with an aqueous solution containing Ru, dried and sintered at 600° C., to prepare the Pt-impregnated $Al_2O_3$ powder, which was mixed with adequate quantities of water and acetic acid, and shredded under the wet condition into the slurry. The slurry was loaded on the honeycomb structure (cell density: 400 cells/$in^2$, volume: 1.0 L, outer diameter: 93 mm, thickness of partition wall: 0.15 mm (approximately 6 mil), cell shape: hexagonal) of cordierite (NGK Insulators, Ltd.). The slurry-loaded a honeycomb structure was sintered at 500° C., to produce the catalyst unit A3 carrying the catalyst component for steam reforming.

(Catalyst Unit B3)

The catalyst unit B3 carrying the catalyst component for steam reforming was produced in a manner similar to that for the catalyst unit A3, except that the honeycomb structure on which the slurry was loaded had a volume of 0.7 L.

(Catalyst Unit C3)

The catalyst unit C3 carrying the catalyst component for steam reforming was produced in a manner similar to that for the catalyst unit A3, except that the honeycomb structure on which the slurry was loaded had a volume of 0.5 L.

(Catalyst Unit D3)

The catalyst unit D3 carrying the catalyst component for steam reforming was produced in a manner similar to that for the catalyst unit A3, except that the honeycomb structure on which the slurry was loaded had a volume of 0.3 L.

(Catalyst Unit E3)

The catalyst unit E3 carrying the catalyst component for steam reforming was produced in a manner similar to that for the catalyst unit A3, except that thickness of the partition wall of the honeycomb structure on which the slurry was loaded was 0.125 mm (approximately 5 mil).

(Catalyst Unit F3)

The catalyst unit F3 carrying the catalyst component for steam reforming was produced in a manner similar to that for the catalyst unit A3, except that the honeycomb structure on which the slurry was loaded had a cell density of 450 cells/in$^2$ and volume of 0.7 L.

(Catalyst Unit G3)

The catalyst unit G3 carrying the catalyst component for steam reforming was produced in a manner similar to that for the catalyst unit A3, except that the honeycomb structure on which the slurry was loaded had a cell density of 450 cells/in$^2$ and volume of 0.5 L.

(Catalyst Unit H3)

The catalyst unit H3 carrying the catalyst component for steam reforming was produced in a manner similar to that for the catalyst unit A3, except that the honeycomb structure on which the slurry was loaded had a cell density of 450 cells/in$^2$ and volume of 0.3 L.

(Catalyst Unit I3)

The catalyst unit I3 carrying the catalyst component for steam reforming was produced in a manner similar to that for the catalyst unit A3, except that the honeycomb structure on which the slurry was loaded had a cell density of 350 cells/in$^2$ and volume of 0.5 L.

(Catalyst Unit J3)

The catalyst unit J3 carrying the catalyst component for steam reforming was produced in a manner similar to that for the catalyst unit A3, except that the honeycomb structure on which the slurry was loaded had a cell density of 350 cells/in$^2$ and thickness of the partition wall of the honeycomb structure was 0.2 mm (approximately 8 mil).

(Catalyst Unit K3)

The catalyst unit K3 carrying the catalyst component for steam reforming was produced in a manner similar to that for the catalyst unit A3, except that the honeycomb structure on which the slurry was loaded had a cell density of 450 cells/in$^2$ and volume of 0.5L, and thickness of the partition wall of the honeycomb structure was 0.1 mm (approximately 4 mil).

(Catalyst Unit L3)

Commercial γ-Al$_2$O$_3$ having a specific surface area of 200 m$^2$/g was impregnated with an aqueous solution containing copper acetate and another aqueous solution containing zinc acetate, dried and sintered at 500° C., to prepare the Cu/Zn-impregnated Al$_2$O$_3$ powder, which was mixed with adequate quantities of water and acetic acid, and shredded under the wet condition into the slurry. The slurry was loaded on the honeycomb structure (cell density: 400 cells/in$^2$, volume: 1.0 L, outer diameter: 93 mm, thickness of partition wall: 0.15 mm (approximately 6 mil), cell shape: hexagonal) of cordierite (NGK Insulators, Ltd.). The slurry-loaded a honeycomb structure was sintered at 500° C., to produce the catalyst unit L3 carrying the catalyst component for CO shift reaction.

(Catalyst Unit M3)

The catalyst unit M3 carrying the catalyst component for CO shift reaction was produced in a manner similar to that for the catalyst unit L3, except that thickness of the partition wall of the honeycomb structure on which the slurry was loaded was 0.125 mm (approximately 5 mil).

(Catalyst Unit N3)

Commercial γ-Al$_2$O$_3$ having a specific surface area of 200 m$^2$/g was impregnated with an aqueous solution containing H$_2$PtCl$_5$, dried and sintered at 500° C., to prepare the Pt-impregnated Al$_2$O$_3$ powder, which was mixed with adequate quantities of water and acetic acid, and shredded under the wet condition into the slurry. The slurry was loaded on the honeycomb structure (cell density: 400 cells/in$^2$, volume: 1.0 L, outer diameter: 93 mm, thickness of partition wall: 0.15 mm (approximately 6 mil), cell shape: hexagonal) of cordierite (NGK Insulators, Ltd.). The slurry-loaded a honeycomb structure was sintered at 500° C., to produce the catalyst unit N3 carrying the catalyst component for selective CO oxidation.

(Catalyst Unit O3)

The catalyst unit O3 carrying the catalyst component for selective CO oxidation was produced in a manner similar to that for the catalyst unit N3, except that the honeycomb structure on which the slurry was loaded had a cell density of 450 cells/in$^2$.

(Catalyst Unit P3)

The catalyst unit P3 carrying the catalyst component for selective CO oxidation was produced in a manner similar to that for the catalyst unit N3, except that the honeycomb structure on which the slurry was loaded had a cell density of 350 cells/in$^2$.

(Catalyst Unit Q3)

The catalyst unit Q3 carrying the catalyst component for selective CO oxidation was produced in a manner similar to that for the catalyst unit N3, except that the honeycomb structure on which the slurry was loaded had a cell density of 350 cells/in$^2$ and thickness of the partition wall of the honeycomb structure was 0.125 mm (approximately 5 mil).

(Catalyst Unit R3)

The catalyst unit R3 carrying the catalyst component for selective CO oxidation was produced in a manner similar to that for the catalyst unit N3, except that the honeycomb structure on which the slurry was loaded had a cell density of 450 cells/in$^2$ and thickness of the partition wall of the honeycomb structure was 0.1 mm (approximately 4 mil).

[Configuration of Reformers]

The reformers of the following configurations were produced using the catalyst units described above. The notation numbers in the drawings in parentheses are attached to the catalyst units, to clearly distinguish the catalyst unit types from notation numbers.

(Reformer A3)

Figure 23:
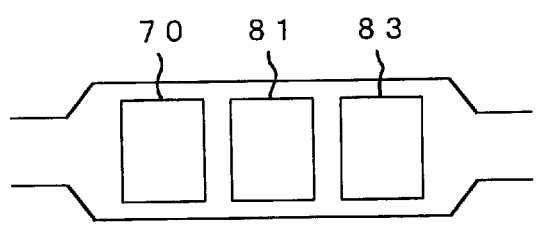
FIG. 23 is a schematic sectional view of one embodiment of the reformer of the third invention, used in EXAMPLE.

The reformer A3 comprised the catalyst unit A3(70), catalyst unit L3(81) and catalyst unit N3(83) in this order in the flow path from the upstream (FIG. 23). The following relationships held with respect to cell density and heat capacity:

Cell density: Catalyst unit A3=Catalyst unit L3=Catalyst unit N3

Heat capacity: Catalyst unit A3=Catalyst unit L3=Catalyst unit N3

(Reformer B3)

Figure 24:
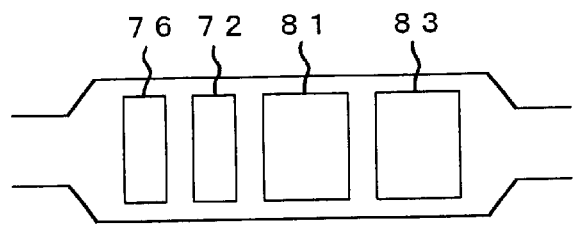
FIG. 24 is a schematic sectional view of another embodiment of the reformer of the third invention, used in EXAMPLE.

The reformer B3 comprised the catalyst unit G3(76), catalyst unit C3(72), catalyst unit L3(81) and catalyst unit N3(83) in this order in the flow path from the upstream (FIG. 24). The following relationships held with respect to cell density and heat capacity:

Cell density: Catalyst unit G3>Catalyst unit C3=Catalyst unit L3=Catalyst unit N3

Heat capacity: Catalyst unit G3>Catalyst unit C3<Catalyst unit L3=Catalyst unit N3

(Reformer C3)

Figure 25:
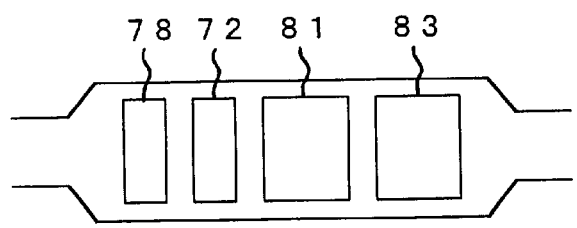
FIG. 25 is a schematic sectional view of still another embodiment of the reformer of the third invention, used in EXAMPLE.

The reformer C3 comprised the catalyst unit 13(78), catalyst unit C3(72), catalyst unit L3(81) and catalyst unit N3(83) in this order in the flow path from the upstream (FIG. 25). The following relationships held with respect to cell density and heat capacity:

Cell density: Catalyst unit I3<Catalyst unit C3=Catalyst unit L3=Catalyst unit N3

Heat capacity: Catalyst unit I3<Catalyst unit C3<Catalyst unit L3=Catalyst unit N3

(Reformer D3)

Figure 26:
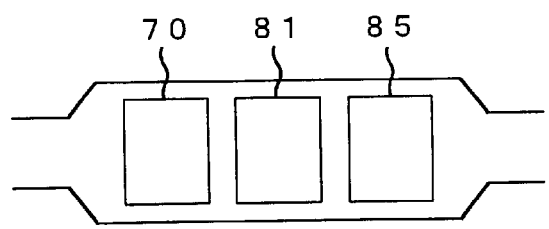
FIG. 26 is a schematic sectional view of still another embodiment of the reformer of the third invention, used in EXAMPLE.

The reformer D3 comprised the catalyst unit A3(70), catalyst unit L3(81) and catalyst unit P3(85) in this order in the flow path from the upstream (FIG. 26). The following relationships held with respect to cell density and heat capacity:

Cell density: Catalyst unit A3=Catalyst unit L3>Catalyst unit P3

Heat capacity: Catalyst unit A3=Catalyst unit L3>Catalyst unit P3

(Reformer E3)

Figure 27:
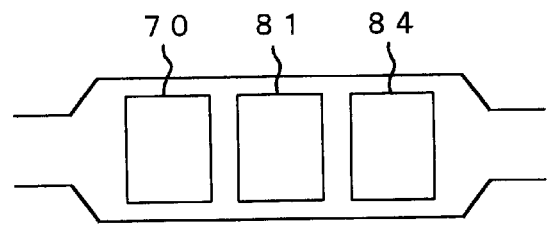
FIG. 27 is a schematic sectional view of still another embodiment of the reformer of the third invention, used in EXAMPLE.

The reformer E3 comprised the catalyst unit A3(70), catalyst unit L3(81) and catalyst unit O3(84) in this order in the flow path from the upstream (FIG. 27). The following relationships held with respect to cell density and heat capacity:

Cell density: Catalyst unit A3=Catalyst unit L3<Catalyst unit O3

Heat capacity: Catalyst unit A3=Catalyst unit L3<Catalyst unit O3

(Reformer F3)

Figure 28:
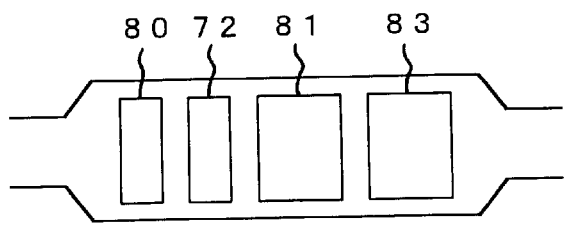
FIG. 28 is a schematic sectional view of still another embodiment of the reformer of the third invention, used in EXAMPLE.

The reformer F3 comprised the catalyst unit K3(80), catalyst unit C3(72), catalyst unit L3(81) and catalyst unit N3(83) in this order in the flow path from the upstream (FIG. 28). The following relationships held with respect to cell density and heat capacity:

Cell density: Catalyst unit K3>Catalyst unit C3=Catalyst unit L3=Catalyst unit N3

Heat capacity: Catalyst unit K3<Catalyst unit C3<Catalyst unit L3=Catalyst unit N3

(Reformer G3)

Figure 29:
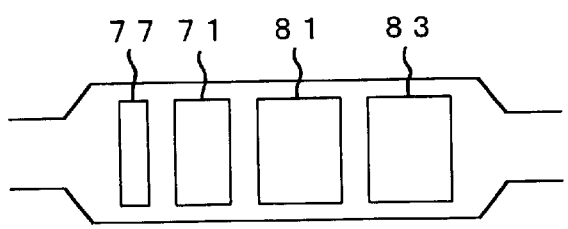
FIG. 29 is a schematic sectional view of still another embodiment of the reformer of the third invention, used in EXAMPLE.

The reformer G3 comprised the catalyst unit H3(77), catalyst unit B3(71), catalyst unit L3(81) and catalyst unit N3(83) in this order in the flow path from the upstream (FIG. 29). The following relationships held with respect to cell density and heat capacity:

Cell density: Catalyst unit H3>Catalyst unit B3=Catalyst unit L3=Catalyst unit N3

Heat capacity: Catalyst unit H3<Catalyst unit B3<Catalyst unit L3=Catalyst unit N3

(Reformer H3)

Figure 30:
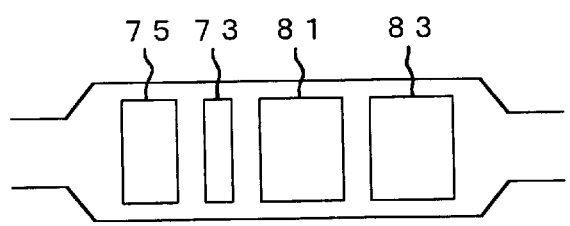
FIG. 30 is a schematic sectional view of still another embodiment of the reformer of the third invention, used in EXAMPLE.

The reformer H3 comprised the catalyst unit F3(75), catalyst unit D3(73), catalyst unit L3(81) and catalyst unit N3(83) in this order in the flow path from the upstream (FIG. 30). The following relationships held with respect to cell density and heat capacity:

Cell density: Catalyst unit F3>Catalyst unit D3=Catalyst unit L3=Catalyst unit N3

Heat capacity: Catalyst unit F3>Catalyst unit D3<Catalyst unit L3=Catalyst unit N3

(Reformer I3)

Figure 31:
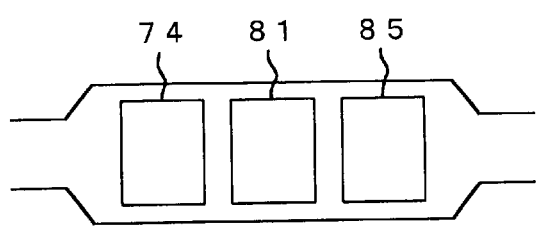
FIG. 31 is a schematic sectional view of still another embodiment of the reformer of the third invention, used in EXAMPLE.

The reformer I3 comprised the catalyst unit E3(74), catalyst unit L3(81) and catalyst unit P3(85) in this order in the flow path from the upstream (FIG. 31). The following relationships held with respect to cell density and heat capacity:

Cell density: Catalyst unit E3=Catalyst unit L3>Catalyst unit P3

Heat capacity: Catalyst unit E3<Catalyst unit L3>Catalyst unit P3

(Reformer J3)

Figure 32:
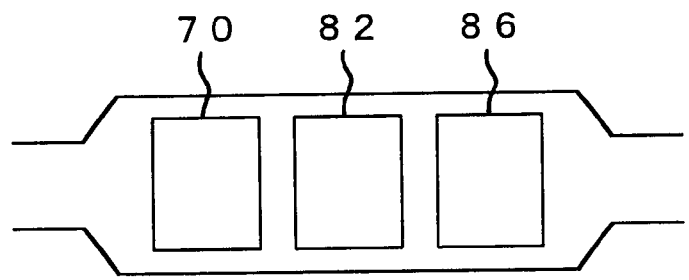
FIG. 32 is a schematic sectional view of still another embodiment of the reformer of the third invention, used in EXAMPLE.

The reformer J3 comprised the catalyst unit A3(70), catalyst unit M3(82) and catalyst unit Q3(86) in this order in the flow path from the upstream (FIG. 32). The following relationships held with respect to cell density and heat capacity:

Cell density: Catalyst unit A3=Catalyst unit M3>Catalyst unit Q3

Heat capacity: Catalyst unit A3>Catalyst unit M3>Catalyst unit Q3

(Reformer K3)

Figure 33:
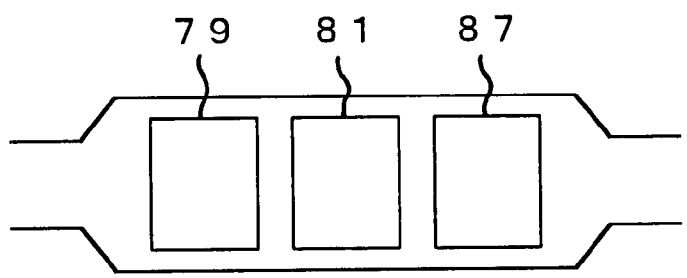
FIG. 33 is a schematic sectional view of a reformer, used in COMPARATIVE EXAMPLE, to be compared with the reformer of the third invention.

The reformer K3 comprised the catalyst unit J3(79), catalyst unit L3(81) and catalyst unit R3(87) in this order in the flow path from the upstream (FIG. 33). The following relationships held with respect to cell density and heat capacity:

Cell density: Catalyst unit J3<Catalyst unit L3<Catalyst unit R3

Heat capacity: Catalyst unit J3>Catalyst unit L3>Catalyst unit R3

[Assessment of Reformers]

Methanol ($CH_3OH$) and $H_2O$ were fed at constant rates to each of the reformers A3 to K3, where steam carbon ratio (S/C) of the feed stream was set at 2.0. The feed stream was preheated to 600° C. beforehand. For the reformer simultaneously having the catalyst unit carrying the catalyst component for CO shift reaction and that carrying the catalyst component for selective CO oxidation, air was fed to the system between these catalyst units, to supply oxygen required by the latter.

Each catalyst unit was operated for 100 h continuously, then stopped, and allowed to cool sufficiently. It was then restarted, and conversion of methanol attained for 3 min (including time for cold starting) was measured, where the conversion was determined by dividing a total mol number of CO and $CO_2$ formed by mol number of methanol fed. The conversion, used as a measure of hydrogen production efficiency, for each reformer is given in Table 3. Concentration of CO in the effluent gas was used as a measure of CO abatement efficiency for the catalyst unit carrying the catalyst component for CO shift reaction and that carrying the catalyst component for selective CO oxidation. It was measured 1 and 3 min after supply of the starting mixture was started, to assess cold starting capacity of the reformer. The results are also given in Table 3.

TABLE 3

| | Reformer | Conversion of Methanol (%) | Concentration of CO in Effluent Gas (ppm) in 1 min | in 3 min |
|---|---|---|---|---|
| EXAMPLE 20 | A3 | 70 | 50 | 15 |
| EXAMPLE 21 | B3 | 81 | 55 | 20 |
| EXAMPLE 22 | C3 | 66 | 45 | 10 |
| EXAMPLE 23 | D3 | 71 | 40 | 10 |
| EXAMPLE 24 | E3 | 69 | 65 | 30 |
| EXAMPLE 25 | F3 | 85 | 55 | 20 |
| EXAMPLE 26 | G3 | 85 | 55 | 20 |
| EXAMPLE 27 | H3 | 78 | 50 | 20 |
| EXAMPLE 28 | I3 | 74 | 40 | 10 |
| EXAMPLE 29 | J3 | 68 | 55 | 20 |
| COMPARATIVE EXAMPLE 3 | K3 | 52 | 70 | 35 |

As described above, the reformer of the first invention comprising two or more catalyst units is improved in the relationship between these catalyst units with respect to heat capacity. This improvement leads to improvement of the reformer in safety, heating characteristics during the start-up period, efficiency of hydrogen production and reduction in production of CO as the coproduct.

The reformer of the second invention comprising two or more catalyst units of a honeycomb structure is improved in the relationship between these catalyst units with respect to cell density, in particular in consideration of the case where the reaction taking place in the catalyst unit is essentially exothermic or endothermic to release or absorb a large quantity of heat, or where the reactant is charged into the reactor at a high concentration. This improvement leads to improvement of the reformer in efficiency of hydrogen production and reduction in production of CO as the coproduct.

The reformer of the third invention comprising two or more catalyst units of a honeycomb structure is improved in the relationship between these catalyst units with respect to cell density, in particular in consideration of the case where the reaction taking place in the catalyst unit is not so fast as combustion, or where the reactant stream contains a poisonous material to the catalyst, e.g., gasoline. This improvement leads to improvement of the reformer in efficiency of hydrogen production and reduction in production of CO as the coproduct.

What is claimed is:

1. A reformer for generating hydrogen from a reactant fluid containing an organic compound or carbon monoxide disposed in the flow path of a reactant fluid wherein the reactant fluid flows from an upstream position to a downstream position, comprising a reactant fluid supply means for supplying a hydrogen generating reactant fluid containing an organic compound or carbon monoxide, an inlet connected to said reactant fluid supply means for feeding said reactant fluid to said reformer, two or more catalyst units in series in the reformer for generating hydrogen from the reactant fluid containing an organic compound or carbon monoxide, by catalysis, and an outlet for a reformed gas containing hydrogen downstream of the catalyst units, wherein at least two of said two or more catalyst units satisfy the following relationship:

Heat capacity of the upstream-side catalyst unit<Heat capacity of the downstream-side catalyst unit.

2. The reformer according to claim 1, wherein one of said two or more catalyst units disposed at the most upstream position and at least one of the other said two or more catalyst units satisfy the relationship:

Heat capacity of the upstream-side catalyst unit≦Heat capacity of the downstream-side catalyst unit.

3. The reformer according to claim 1, wherein at least two of said two or more catalyst units adjacent to each other satisfy the relationship:

Heat capacity of the upstream-side catalyst unit≦Heat capacity of the downstream-side catalyst unit.

4. The reformer according to claim 1, wherein one of said two or more catalyst units disposed at the most upstream position and the other one adjacent thereto satisfy the relationship:

Heat capacity of the upstream-side catalyst unit≦Heat capacity of the downstream-side catalyst unit.

5. The reformer according to claim 1, wherein one of said two or more catalyst units disposed at the most upstream position and any of the other said catalyst units satisfy the relationship:

Heat capacity of the upstream-side catalyst unit≦Heat capacity of the downstream-side catalyst unit.

6. The reformer according to claim 1, wherein each of said two or more catalyst units is of a honeycomb structure.

7. The reformer according to claim 6, wherein at least two of said two or more catalyst units satisfy the following relationship:

Cell density of the upstream-side catalyst unit≦Cell density of the downstream-side catalyst unit.

8. The reformer according to claim 6, wherein at least two of said two or more catalyst units satisfy the following relationship:

Cell density of the upstream-side catalyst unit≧Cell density of the downstream-side catalyst unit.

9. The reformer according to claim 1, wherein said two or more catalyst units contains one or more catalyst components selected from the group consisting of catalyst components for: steam reforming, partial oxidation, partial decomposition, CO shift reaction, and selective CO oxidation.

10. The reformer according to claim 9, wherein said one or more catalyst components contain a heat-resistant oxide and at least one metal element selected from the group consisting of those of groups VB to VIII, IB and IIB of the long-form periodic table.

11. The reformer according to claim 10, wherein said at least one metal element is at least one of those selected from the group consisting of metal elements of group VIII, V, Cr, Mo, W, Re, metal elements of group IB, and Zn.

12. The reformer according to claim 10, wherein said heat-resistant oxide is selected from the group consisting of $Al_2O_3$, $SiO_2$, $TiO_2$, $ZrO_2$, MgO, zeolite, SAPO, ALPO, a layer structure compound and a compound oxide thereof.

13. The reformer according to claim 1, wherein one of said two or more catalyst units disposed at the most upstream position is positioned just after and downstream from said inlet for a feed reactant fluid whereby the catalyst treats only said feed reactant fluid.

14. A reformer for generating hydrogen from a reactant fluid containing an organic compound or carbon monoxide disposed in the flow path of a reactant fluid wherein the reactant fluid flows from an upstream position to a downstream position, said reformer comprising a reactant fluid supply means for supplying a hydrogen generating reactant fluid containing an organic compound or carbon monoxide, an inlet connected to said reactant fluid supply means for feeding said reactant fluid to said reformer, two or more catalyst units of a honeycomb structure in series in the reformer for generating hydrogen from the reactant fluid containing an organic compound or carbon monoxide, by catalysis, and an outlet for a reformed gas containing hydrogen downstream of the catalyst units, wherein at least two of said two or more catalyst units satisfy the following relationship:

Cell density of the upstream-side catalyst unit<Cell density of the downstream-side catalyst unit.

15. The reformer according to claim 14, wherein one of said two or more catalyst units disposed at the most upstream position and at least one of the other said two or more catalyst units satisfy the relationship:

Cell density of the upstream-side catalyst unit≦Cell density of the downstream-side catalyst unit.

16. The reformer according to claim 14, wherein at least two of said two or more catalyst units adjacent to each other satisfy the relationship:
Cell density of the upstream-side catalyst unit≦Cell density of the downstream-side catalyst unit.

17. The reformer according to claim 13, wherein one of said two or more catalyst units disposed at the most upstream position and the other one adjacent thereto satisfy the relationship:

Cell density of the upstream-side catalyst unit≦Cell density of the downstream-side catalyst unit.

18. The reformer according to claim 14, wherein one of said two or more catalyst units disposed at the most upstream position and any of the other said two or more catalyst units satisfy the relationship:

Cell density of the upstream-side catalyst unit≦Cell density of the downstream-side catalyst unit.

19. The reformer according to claim 14, wherein said two or more catalyst units contain one or more catalyst components selected from the group consisting of catalyst components for: steam reforming, partial oxidation, partial decomposition, CO shift reaction, and selective CO oxidation.

20. The reformer according to claim 19, wherein said one or more catalyst components contain as the major a heat-resistant oxide and at least one metal element selected from the group consisting of those of groups VB to VIII, IB and IIB of the long-form periodic table.

21. The reformer according to claim 20, wherein said at least one metal element is at least one of those selected from the group consisting of metal elements of group VIII, V, Cr, Mo, W, Re, metal elements of group IB, and Zn.

22. The reformer according to claim 20, wherein said heat-resistant oxide is selected from the group consisting of $Al_2O_3$, $SiO_2$, $TiO_2$, $ZrO_2$, MgO, zeolite, SAPO, ALPO, a layer structure compound and a compound oxide thereof.

23. The reformer according to claim 14, wherein at least two of said two or more catalyst units further satisfy the following relationship:

Heat capacity of the upstream-side catalyst unit≦Heat capacity of the downstream-side catalyst unit.

24. A reformer for generating hydrogen from a reactant fluid containing an organic compound or carbon monoxide disposed in the flow path of a reactant fluid wherein the reactant fluid flows from an upstream position to a downstream position, said reformer comprising a reactant fluid supply means for supplying a hydrogen generating reactant fluid containing an organic compound or carbon monoxide, an inlet connected to said reactant fluid supply means for feeding said reactant fluid to said reformer, two or more catalyst units of a honeycomb structure in series in the reformer for generating hydrogen from the reactant fluid containing an organic compound or carbon monoxide, by catalysis, and an outlet for a reformed gas containing hydrogen downstream of the catalyst units, wherein, at least two of said two or more catalyst units satisfy the following relationship:

Cell density of the upstream-side catalyst unit>Cell density of the downstream-side catalyst unit.

25. The reformer according to claim 24, wherein one of said two or more catalyst units disposed at the most upstream position and at least one of the other said two or more catalyst units satisfy the relationship:

Cell density of the upstream-side catalyst unit≧Cell density of the downstream-side catalyst unit.

26. The reformer according to claim 24, wherein at least two of said two or more catalyst units adjacent to each other satisfy the relationship:

Cell density of the upstream-side catalyst unit≧Cell density of the downstream-side catalyst unit.

27. The reformer according to claim 24, wherein one of said two or more catalyst units disposed at the most upstream position and the other one adjacent thereto satisfy the relationship:
Cell density of the upstream-side catalyst unit≧Cell density of the downstream-side catalyst unit.

28. The reformer according to claim 24, wherein one of said two or more catalyst units disposed at the most upstream position and any of the other said catalyst units satisfy the relationship:

Cell density of the upstream-side catalyst unit≧Cell density of the downstream-side catalyst unit.

29. The reformer according to claim 24, wherein said two or more catalyst units contain one or more catalyst components selected from the group consisting of catalyst components for: steam reforming, partial oxidation, partial decomposition, CO shift reaction, and selective CO oxidation.

30. The reformer according to claim 29, wherein said one or more catalyst components contain, as the major ingredients, a heat-resistant oxide and at least one metal element selected from the group consisting of those of groups VB to VIII, IB and IIE of the long-form periodic table.

31. The reformer according to claim 29, wherein said at least one metal element is at least one of those selected from the group consisting of metal elements of group VIII, V, Cr, Mo, W, Re, metal elements of group IB, and Zn.

32. The reformer according to claim 30, wherein said heat-resistant oxide is selected from the group consisting of $Al_2O_3$, $SiO_2$, $TiO_2$, $ZrO_2$, MgO, zeolite, SAPO, ALPO, a layer structure compound and a compound oxide thereof.

33. The reformer according to claim 24, wherein at least two of said catalyst units further satisfy the following relationship:

Heat capacity of the upstream-side catalyst unit ≦ Heat capacity of the downstream-side catalyst unit.

* * * * *